US012025046B2

(12) United States Patent
Furui

(10) Patent No.: US 12,025,046 B2
(45) Date of Patent: Jul. 2, 2024

(54) EXHAUST GAS CONTROL APPARATUS FOR INTERNAL COMBUSTION ENGINE AND EXHAUST GAS CONTROL METHOD FOR THE SAME

(71) Applicant: TOYOTA JIDOSHA KABUSHIKI KAISHA, Toyota (JP)

(72) Inventor: Kenji Furui, Shizuoka (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 18/134,337

(22) Filed: Apr. 13, 2023

(65) Prior Publication Data

US 2023/0407776 A1 Dec. 21, 2023

(30) Foreign Application Priority Data

Jun. 21, 2022 (JP) ................................ 2022-099727

(51) Int. Cl.
*F01N 9/00* (2006.01)
*F01N 11/00* (2006.01)
*F02D 41/14* (2006.01)

(52) U.S. Cl.
CPC .............. *F01N 9/00* (2013.01); *F01N 11/007* (2013.01); *F01N 9/007* (2013.01); *F01N 2560/02* (2013.01); *F01N 2900/0402* (2013.01); *F01N 2900/0408* (2013.01); *F01N 2900/0411* (2013.01); *F01N 2900/0416* (2013.01);

(Continued)

(58) Field of Classification Search
CPC combination set(s) only.
See application file for complete search history.

(56) References Cited

U.S. PATENT DOCUMENTS

2003/0029426 A1* 2/2003 Surnilla ................ F02D 41/065 123/685
2003/0150208 A1* 8/2003 Hirata .................. F01N 13/009 60/285

(Continued)

FOREIGN PATENT DOCUMENTS

DE 10 2004-031083 B3 5/2005
DE 10 2010-022683 A1 4/2011

(Continued)

*Primary Examiner* — Binh Q Tran
(74) *Attorney, Agent, or Firm* — Finnegan, Henderson, Farabow, Garrett & Dunner, LLP

(57) ABSTRACT

An exhaust gas control apparatus for the internal combustion engine includes a catalyst disposed in an exhaust passage, an upstream air-fuel ratio sensor configured to detect an air-fuel ratio of in-flow exhaust gas that flows into the catalyst, a downstream air-fuel ratio sensor configured to detect an air-fuel ratio of out-flow exhaust gas that flows out of the catalyst, and an electronic control unit configured to control the air-fuel ratio of the in-flow exhaust gas. The electronic control unit is configured to, when a predetermined condition is satisfied, control the air-fuel ratio of the in-flow exhaust gas based on an output from the downstream air-fuel ratio sensor without using an output from the upstream air-fuel ratio sensor. The electronic control unit is configured to, when the predetermined condition is not satisfied, control the air-fuel ratio of the in-flow exhaust gas based on the output from the upstream air-fuel ratio sensor.

8 Claims, 6 Drawing Sheets

(52) U.S. Cl.
CPC .. *F01N 2900/06* (2013.01); *F01N 2900/1402* (2013.01); *F02D 41/1454* (2013.01); *F02D 41/1456* (2013.01); *F02D 2200/0814* (2013.01)

(56) References Cited

U.S. PATENT DOCUMENTS

| | | | | |
|---|---|---|---|---|
| 2004/0216450 | A1* | 11/2004 | Okazaki | F02D 41/0235<br>60/285 |
| 2004/0244364 | A1* | 12/2004 | Makki | F02D 41/0295<br>60/285 |
| 2005/0028517 | A1* | 2/2005 | Nakagawa | F01N 3/30<br>60/285 |
| 2008/0295488 | A1* | 12/2008 | Takubo | F02D 41/1445<br>60/299 |
| 2010/0078000 | A1* | 4/2010 | Sakamoto | F01N 3/10<br>60/299 |
| 2018/0017008 | A1* | 1/2018 | Martin | F02D 41/3005 |
| 2020/0132007 | A1 | 4/2020 | Genko | |

FOREIGN PATENT DOCUMENTS

| | | | |
|---|---|---|---|
| DE | 10 2011-006170 | A1 | 6/2012 |
| EP | 2157303 | A1 | 2/2010 |
| JP | 2006-022755 | A | 1/2006 |
| JP | 2007-218096 | A | 8/2007 |
| JP | 2010-159672 | A | 7/2010 |
| JP | 2020-067071 | A | 4/2020 |

* cited by examiner

EXHAUST GAS CONTROL APPARATUS FOR INTERNAL COMBUSTION ENGINE AND EXHAUST GAS CONTROL METHOD FOR THE SAME

CROSS-REFERENCE TO RELATED APPLICATION

This application claims priority to Japanese Patent Application No. 2022-099727 filed on Jun. 21, 2022, incorporated herein by reference in its entirety.

BACKGROUND

1. Technical Field

The present disclosure relates to an exhaust gas control apparatus for an internal combustion engine and an exhaust gas control method for the exhaust gas control apparatus.

2. Description of Related Art

In internal combustion engines, it has hitherto been known that a catalyst that can store oxygen is disposed in an exhaust passage to control HC, CO, NOx, and the like in exhaust gas. Japanese Unexamined Patent Application Publication Nos. 2020-067071 (JP 2020-067071 A), 2010-159672 (JP 2010-159672 A), 2007-218096 (JP 2007-218096 A), and 2006-022755 (JP 2006-022755 A) describe that the air-fuel ratio of exhaust gas flowing into a catalyst is controlled based on outputs from an upstream air-fuel ratio sensor disposed on an upstream side of the catalyst and a downstream air-fuel ratio sensor disposed on a downstream side of the catalyst in order to effectively control the exhaust gas by using the catalyst.

SUMMARY

When the combustion state of an air-fuel mixture is unstable as in a case of cold start of the internal combustion engine, however, exhaust gas containing a large amount of unburned polymer HC is discharged into the exhaust passage. Since the diffusion coefficient of polymer HC is small at this time, the air-fuel ratio of the exhaust gas that is detected by the upstream air-fuel ratio sensor deviates from an actual value to a lean side. Therefore, when feedback control on the air-fuel ratio is performed based on the output from the upstream air-fuel ratio sensor, the actual air-fuel ratio may deviate from a target value to a rich side, which may exacerbate exhaust emissions.

In view of the above, it is necessary to suppress the exacerbation of exhaust emissions due to the output deviation of the air-fuel ratio sensor disposed on the upstream side of the catalyst.

A first aspect of the present disclosure relates to an exhaust gas control apparatus for an internal combustion engine, including a catalyst, an upstream air-fuel ratio sensor, a downstream air-fuel ratio sensor, and an electronic control unit. The catalyst is disposed in an exhaust passage. The upstream air-fuel ratio sensor is configured to detect an air-fuel ratio of in-flow exhaust gas that flows into the catalyst. The downstream air-fuel ratio sensor is configured to detect an air-fuel ratio of out-flow exhaust gas that flows out of the catalyst. The electronic control unit is configured to control the air-fuel ratio of the in-flow exhaust gas. The electronic control unit is configured to, when a predetermined condition is satisfied, control the air-fuel ratio of the in-flow exhaust gas based on an output from the downstream air-fuel ratio sensor without using an output from the upstream air-fuel ratio sensor. The electronic control unit is configured to, when the predetermined condition is not satisfied, control the air-fuel ratio of the in-flow exhaust gas based on the output from the upstream air-fuel ratio sensor.

In the exhaust gas control apparatus according to the first aspect described above, the electronic control unit may be configured to, when the predetermined condition is satisfied, control the air-fuel ratio of the in-flow exhaust gas without using the output from the upstream air-fuel ratio sensor to cause the air-fuel ratio detected by the downstream air-fuel ratio sensor to agree with a stoichiometric air-fuel ratio.

In the exhaust gas control apparatus according to the first aspect described above, the predetermined condition may be that warm-up of the internal combustion engine is not completed.

In the exhaust gas control apparatus configured as described above, the electronic control unit may be configured to determine that the warm-up of the internal combustion engine is completed when a temperature of a coolant of the internal combustion engine rises to a predetermined temperature.

In the exhaust gas control apparatus according to the first aspect described above, the predetermined condition may be that an intake air amount is equal to or smaller than a predetermined value.

In the exhaust gas control apparatus according to the first aspect described above, the predetermined condition may be that an idling of the internal combustion engine is executed.

A second aspect of the present disclosure relates to an exhaust gas control method for an exhaust gas control apparatus for an internal combustion engine, including a catalyst, an upstream air-fuel ratio sensor, a downstream air-fuel ratio sensor, and an electronic control unit. The catalyst is disposed in an exhaust passage. The upstream air-fuel ratio sensor is configured to detect an air-fuel ratio of in-flow exhaust gas that flows into the catalyst. The downstream air-fuel ratio sensor is configured to detect an air-fuel ratio of out-flow exhaust gas that flows out of the catalyst. The electronic control unit is configured to control the air-fuel ratio of the in-flow exhaust gas. The exhaust gas control method includes: (i) controlling, when a predetermined condition is satisfied, the air-fuel ratio of the in-flow exhaust gas based on an output from the downstream air-fuel ratio sensor without using an output from the upstream air-fuel ratio sensor; and (ii) controlling, when the predetermined condition is not satisfied, the air-fuel ratio of the in-flow exhaust gas based on the output from the upstream air-fuel ratio sensor.

According to the exhaust gas control apparatus for the internal combustion engine and the exhaust gas control method for the exhaust gas control apparatus in the present disclosure, it is possible to suppress the exacerbation of exhaust emissions due to the output deviation of the air-fuel ratio sensor disposed on the upstream side of the catalyst.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of the present disclosure will be described in detail below with reference to the drawings. In the following description, like constituent elements are denoted by like reference signs.

Figure 1:
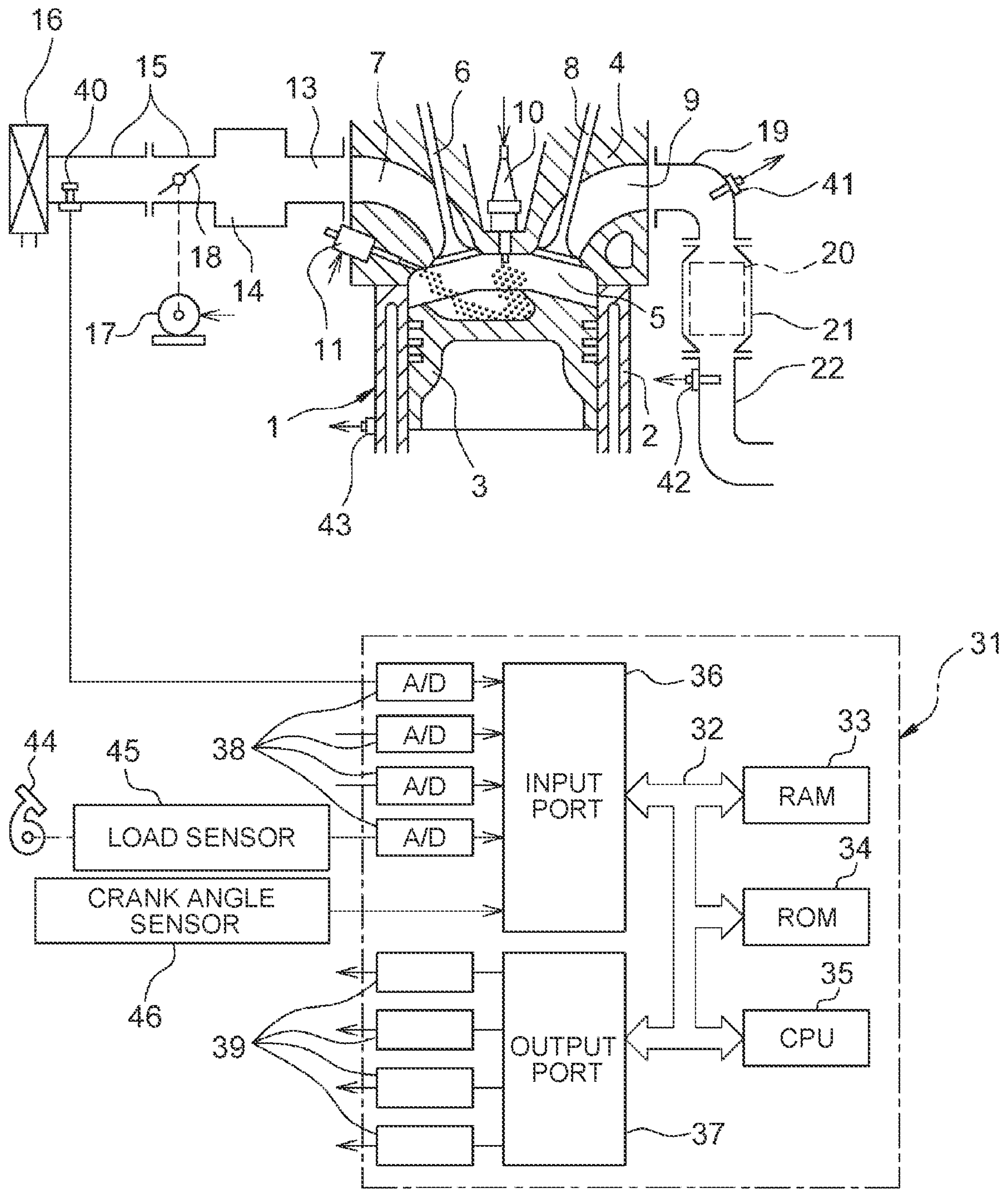
FIG. 1 schematically illustrates an internal combustion engine with an exhaust gas control apparatus for an internal combustion engine according to an embodiment of the present disclosure.

First, the entire internal combustion engine is described. FIG. 1 schematically illustrates an internal combustion engine with an exhaust gas control apparatus for an internal combustion engine according to the embodiment of the present disclosure. The internal combustion engine illustrated in FIG. 1 is a spark-ignition internal combustion engine. The internal combustion engine is mounted on a vehicle, and functions as a power source for the vehicle.

The internal combustion engine includes an engine body 1 that includes a cylinder block 2 and a cylinder head 4. A plurality of (for example, four) cylinders is formed inside the cylinder block 2. A piston 3 is disposed in each cylinder to reciprocate in a direction of an axis of the cylinder. A combustion chamber 5 is formed between the piston 3 and the cylinder head 4.

An intake port 7 and an exhaust port 9 are formed in the cylinder head 4. The intake port 7 and the exhaust port 9 are connected to the combustion chamber 5.

The internal combustion engine also includes an intake valve 6 and an exhaust valve 8 disposed in the cylinder head 4. The intake valve 6 opens and closes the intake port 7. The exhaust valve 8 opens and closes the exhaust port 9.

The internal combustion engine includes a spark plug 10 and a fuel injection valve 11. The spark plug 10 is disposed at the central portion of the inner wall surface of the cylinder head 4, and generates a spark in response to an ignition signal. The fuel injection valve 11 is disposed at the peripheral portion of the inner wall surface of the cylinder head 4, and injects fuel into the combustion chamber 5 in response to an injection signal. In the present embodiment, gasoline with a stoichiometric air-fuel ratio of 14.6 is used as the fuel to be supplied to the fuel injection valve 11.

The internal combustion engine also includes an intake manifold 13, a surge tank 14, an intake pipe 15, an air cleaner 16, and a throttle valve 18. The intake port 7 of each cylinder is coupled to the surge tank 14 via the corresponding intake manifold 13. The surge tank 14 is coupled to the air cleaner 16 via the intake pipe 15. The intake port 7, the intake manifold 13, the surge tank 14, the intake pipe 15, and the like form an intake passage that leads air to the combustion chamber 5. The throttle valve 18 is disposed in the intake pipe 15 between the surge tank 14 and the air cleaner 16, and driven by a throttle valve drive actuator 17 (for example, a direct current (DC) motor). The throttle valve 18 is turned by the throttle valve drive actuator 17 to be able to change the area of opening of the intake passage depending on the degree of opening of the throttle valve 18.

The internal combustion engine also includes an exhaust manifold 19, a catalyst 20, a casing 21, and an exhaust pipe 22. The exhaust port 9 of each cylinder is coupled to the exhaust manifold 19. The exhaust manifold 19 has a plurality of branched portions coupled to the respective exhaust ports 9 and a merged portion at which the branched portions are merged. The merged portion of the exhaust manifold 19 is coupled to the casing 21 in which the catalyst 20 is provided. The casing 21 is coupled to the exhaust pipe 22. The exhaust port 9, the exhaust manifold 19, the casing 21, the exhaust pipe 22, and the like form an exhaust passage that discharges exhaust gas generated through combustion of an air-fuel mixture in the combustion chamber 5.

The vehicle on which the internal combustion engine is mounted is provided with an electronic control unit (ECU) 31. The electronic control unit (ECU) 31 functions as an air-fuel ratio control device. As illustrated in FIG. 1, the ECU 31 is a digital computer, and includes a random-access memory (RAM) 33, a read only memory (ROM) 34, a central processing unit (CPU) 35, an input port 36, and an output port 37, which are connected to each other via a bidirectional bus 32. While one ECU 31 is provided in the present embodiment, a plurality of ECUs may be provided for each function.

The ECU 31 executes various types of control on the internal combustion engine based on, for example, outputs from various sensors provided in the vehicle or the internal combustion engine. Therefore, the outputs from the various sensors are transmitted to the ECU 31. In the present embodiment, outputs from an air flow meter 40, an upstream air-fuel ratio sensor 41, a downstream air-fuel ratio sensor 42, a coolant temperature sensor 43, a load sensor 45, and a crank angle sensor 46 are transmitted to the ECU 31.

The air flow meter 40 is disposed in the intake passage of the internal combustion engine, specifically, in the intake pipe 15 on an upstream side of the throttle valve 18. The air flow meter 40 detects the flow rate of air that flows through the intake passage. The air flow meter 40 is electrically connected to the ECU 31. An output from the air flow meter 40 is input to the input port 36 via a corresponding analog-to-digital (AD) converter 38.

The upstream air-fuel ratio sensor 41 is disposed in the exhaust passage on an upstream side of the catalyst 20, specifically, at the merged portion of the exhaust manifold 19. The upstream air-fuel ratio sensor 41 detects the air-fuel ratio of exhaust gas that flows in the exhaust manifold 19, that is, exhaust gas discharged from the cylinders of the internal combustion engine and flowing into the catalyst 20. The upstream air-fuel ratio sensor 41 is electrically connected to the ECU 31. An output from the upstream air-fuel ratio sensor 41 is input to the input port 36 via a corresponding AD converter 38.

The downstream air-fuel ratio sensor 42 is disposed in the exhaust passage on a downstream side of the catalyst 20, specifically, in the exhaust pipe 22. The downstream air-fuel ratio sensor 42 detects the air-fuel ratio of exhaust gas that flows in the exhaust pipe 22, that is, exhaust gas that flows out of the catalyst 20. The downstream air-fuel ratio sensor 42 is electrically connected to the ECU 31. An output from the downstream air-fuel ratio sensor 42 is input to the input port 36 via a corresponding AD converter 38.

The coolant temperature sensor 43 is disposed in a coolant passage of the internal combustion engine, and detects the temperature of a coolant of the internal combustion engine (engine coolant temperature). The coolant temperature sensor 43 is electrically connected to the ECU 31. An output from the coolant temperature sensor 43 is input to the input port 36 via a corresponding AD converter 38.

The load sensor 45 is connected to an accelerator pedal 44 provided in the vehicle on which the internal combustion engine is mounted, and detects the amount of depression of the accelerator pedal 44 (accelerator operation amount). The load sensor 45 is electrically connected to the ECU 31. An output from the load sensor 45 is input to the input port 36 via a corresponding AD converter 38. The ECU 31 calculates an engine load based on the output from the load sensor 45.

The crank angle sensor 46 generates an output pulse each time a crankshaft of the internal combustion engine rotates by a predetermined angle (for example, 10 degrees). The crank angle sensor 46 is electrically connected to the ECU 31. An output from the crank angle sensor 46 is input to the input port 36. The ECU 31 calculates an engine speed based on the output from the crank angle sensor 46.

The output port 37 of the ECU 31 is connected to the spark plug 10, the fuel injection valve 11, and the throttle valve drive actuator 17 via corresponding drive circuits 39, allowing the ECU 31 to control the spark plug 10, the fuel injection valve 11, and the throttle valve drive actuator 17. Specifically, the ECU 31 controls the ignition timing of the spark plug 10, the injection timing and the injection amount of fuel to be injected from the fuel injection valve 11, and the degree of opening of the throttle valve 18.

Although the internal combustion engine described above is a non-supercharged internal combustion engine that uses gasoline as fuel, the configuration of the internal combustion engine is not limited to the above configuration. Thus, the specific configuration of the internal combustion engine, such as the cylinder arrangement, the manner of fuel injection, the configuration of the intake and exhaust systems, the configuration of the valve moving mechanism, and the presence or absence of a supercharger, may be different from the configuration illustrated in FIG. 1. For example, the fuel injection valve 11 may be disposed to inject fuel into the intake port 7. The internal combustion engine may be provided with a component that allows exhaust gas recirculation (EGR) gas to be recirculated from the exhaust passage to the intake passage.

The exhaust gas control apparatus for the internal combustion engine (hereinafter simply referred to as "exhaust gas control apparatus") according to the embodiment of the present disclosure will be described below. The exhaust gas control apparatus includes the catalyst 20, the upstream air-fuel ratio sensor 41, the downstream air-fuel ratio sensor 42, and the ECU 31. As described above, in the present embodiment, the ECU 31 functions as the air-fuel ratio control device.

The catalyst 20 is disposed in the exhaust passage of the internal combustion engine, and controls exhaust gas that flows through the exhaust passage. In the present embodiment, the catalyst 20 is a three-way catalyst that can store oxygen and can control, for example, hydrocarbon (HC), carbon monoxide (CO), and nitrogen oxide (NOx) at the same time. The catalyst 20 includes a carrier (base) made of ceramic or metal, precious metal having a catalytic action (for example, platinum (Pt), palladium (Pd), or rhodium (Rh)), and a promoter having an oxygen storage capability (for example, ceria ($CeO_2$)). The precious metal and the promoter are carried by the carrier.

Figure 2:
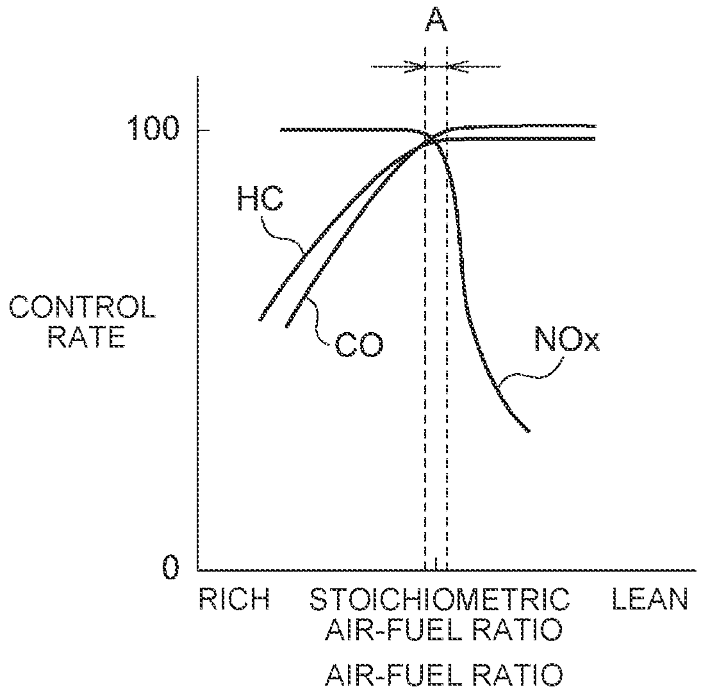
FIG. 2 illustrates an example of the control properties of a three-way catalyst.

FIG. 2 illustrates an example of the control properties of the three-way catalyst. As illustrated in FIG. 2, the rate of control on HC, CO, and NOx by the three-way catalyst is significantly high when the air-fuel ratio of exhaust gas that flows into the three-way catalyst is in a region in the vicinity of the stoichiometric air-fuel ratio (control window A in FIG. 2). Thus, the catalyst 20 can effectively control HC, CO, and NOx when the air-fuel ratio of the exhaust gas is maintained in the vicinity of the stoichiometric air-fuel ratio.

The catalyst 20 stores and releases oxygen depending on the air-fuel ratio of the exhaust gas by using the promoter. Specifically, the catalyst 20 stores excessive oxygen in the exhaust gas when the air-fuel ratio of the exhaust gas is leaner than the stoichiometric air-fuel ratio. The catalyst 20 releases oxygen that is short for oxidizing HC and CO when the air-fuel ratio of the exhaust gas is richer than the stoichiometric air-fuel ratio. As a result, the air-fuel ratio on the surface of the catalyst 20 is maintained in the vicinity of the stoichiometric air-fuel ratio even when the air-fuel ratio of the exhaust gas slightly deviates from the stoichiometric air-fuel ratio. Thus, HC, CO, and NOx are effectively controlled in the catalyst 20.

As illustrated in FIG. 1, the upstream air-fuel ratio sensor 41 and the downstream air-fuel ratio sensor 42 are disposed in the exhaust passage of the internal combustion engine. The downstream air-fuel ratio sensor 42 is disposed on a downstream side of the upstream air-fuel ratio sensor 41. The upstream air-fuel ratio sensor 41 and the downstream air-fuel ratio sensor 42 each detect the air-fuel ratio of the exhaust gas that flows through the exhaust passage.

Figure 3:
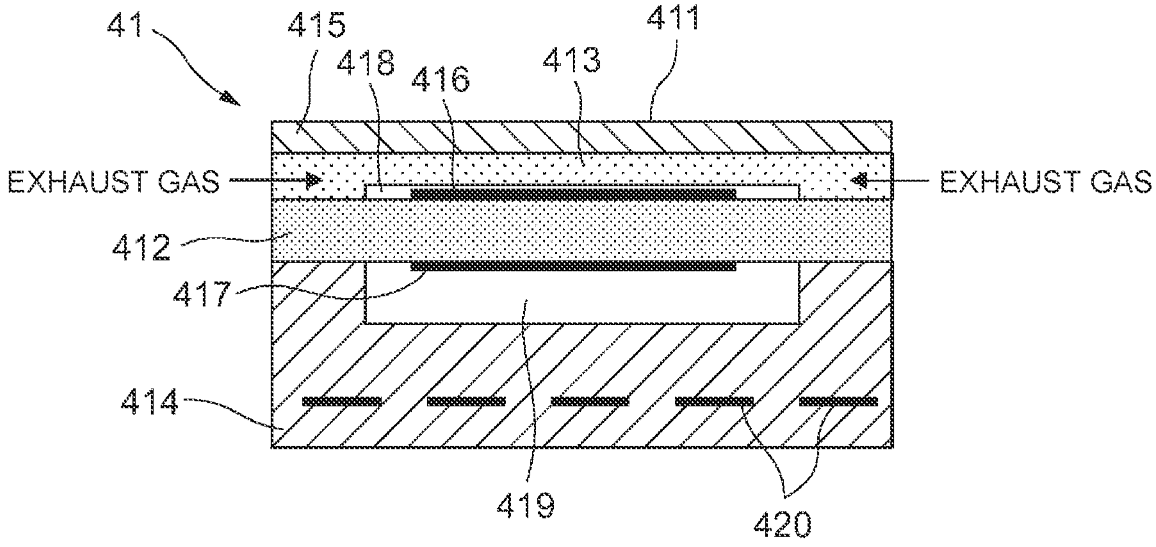
FIG. 3 is a partial sectional view of an upstream air-fuel ratio sensor illustrated in FIG. 1.

FIG. 3 is a partial sectional view of the upstream air-fuel ratio sensor 41. Since the configuration of the upstream air-fuel ratio sensor 41 is known, the configuration will briefly be described below. The downstream air-fuel ratio sensor 42 has the same configuration as that of the upstream air-fuel ratio sensor 41.

The upstream air-fuel ratio sensor 41 includes a sensor element 411 and heaters 420. In the present embodiment, the upstream air-fuel ratio sensor 41 is a stacked air-fuel ratio sensor constituted by stacking a plurality of layers. As illustrated in FIG. 3, the sensor element 411 has a solid electrolyte layer 412, a diffusion limitation layer 413, a first impermeable layer 414, a second impermeable layer 415, an exhaust-side electrode 416, and an atmosphere-side electrode 417. A measured gas chamber 418 is formed between the solid electrolyte layer 412 and the diffusion limitation layer 413. An atmosphere chamber 419 is formed between the solid electrolyte layer 412 and the first impermeable layer 414.

The exhaust gas is introduced into the measured gas chamber 418 via the diffusion limitation layer 413 as gas to be measured. The atmosphere is introduced into the atmosphere chamber 419. When the upstream air-fuel ratio sensor 41 detects the air-fuel ratio of the exhaust gas, a voltage is applied to the sensor element 411 so that the potential of the atmosphere-side electrode 417 is higher than the potential of the exhaust-side electrode 416. When the voltage is applied to the sensor element 411, oxide ions move between the exhaust-side electrode 416 and the atmosphere-side electrode 417 depending on the air-fuel ratio of the exhaust gas on the exhaust-side electrode 416. As a result, a current flowing between the exhaust-side electrode 416 and the atmosphere-side electrode 417, that is, an output current from the upstream air-fuel ratio sensor 41 changes depending on the air-fuel ratio of the exhaust gas.

Figure 4:
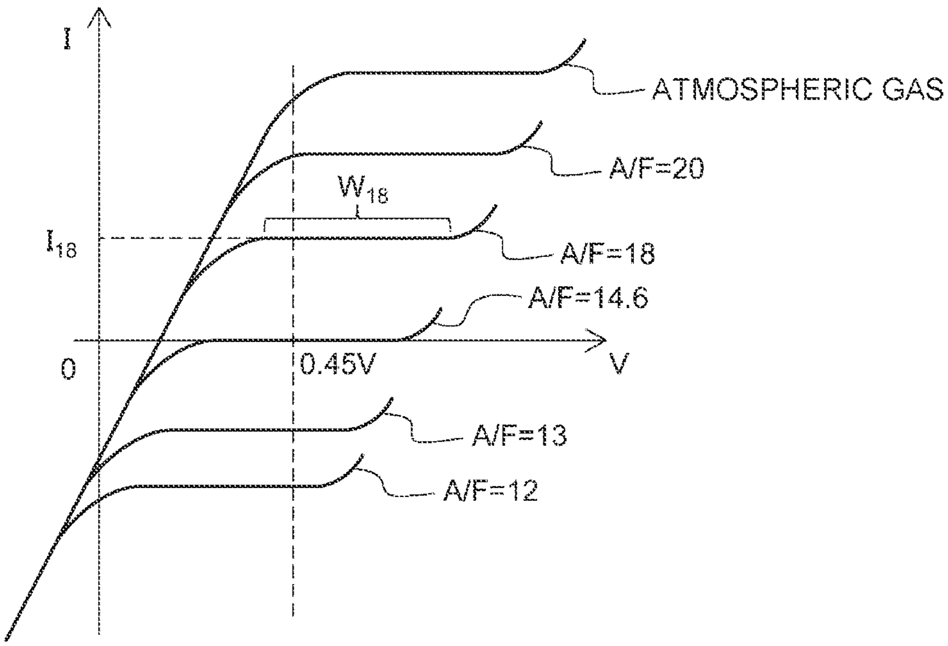
FIG. 4 illustrates voltage-current characteristics of the upstream air-fuel ratio sensor.

FIG. 4 illustrates voltage-current (V-I) characteristics of the upstream air-fuel ratio sensor 41. As illustrated in FIG.

4, an output current I increases as the air-fuel ratio of the exhaust gas increases (is leaner). A V-I line for each air-fuel ratio has a region substantially parallel to a V axis, that is, a region where the output current hardly changes though the voltage applied to the sensor changes. This voltage region is referred to as "limit current region", and the current at this time is referred to as "limit current". In FIG. 4, the limit current region and the limit current when the air-fuel ratio of the exhaust gas is 18 are represented by $W_{18}$ and $I_{18}$, respectively.

A limit current value IL of the air-fuel ratio sensor is generally represented by Expression (1) below.

$$IL=D\times(4FP/RT)\times(S/L)\times\ln(1-(P_{o2}/P)) \quad (1)$$

where D is the diffusion coefficient, F is the Faraday constant, P is the total pressure of the exhaust gas, R is the gas constant, T is the absolute temperature, S is the electrode surface area, L is the diffusion distance, and $P_{o2}$ is the oxygen partial pressure of the exhaust gas.

Figure 5:
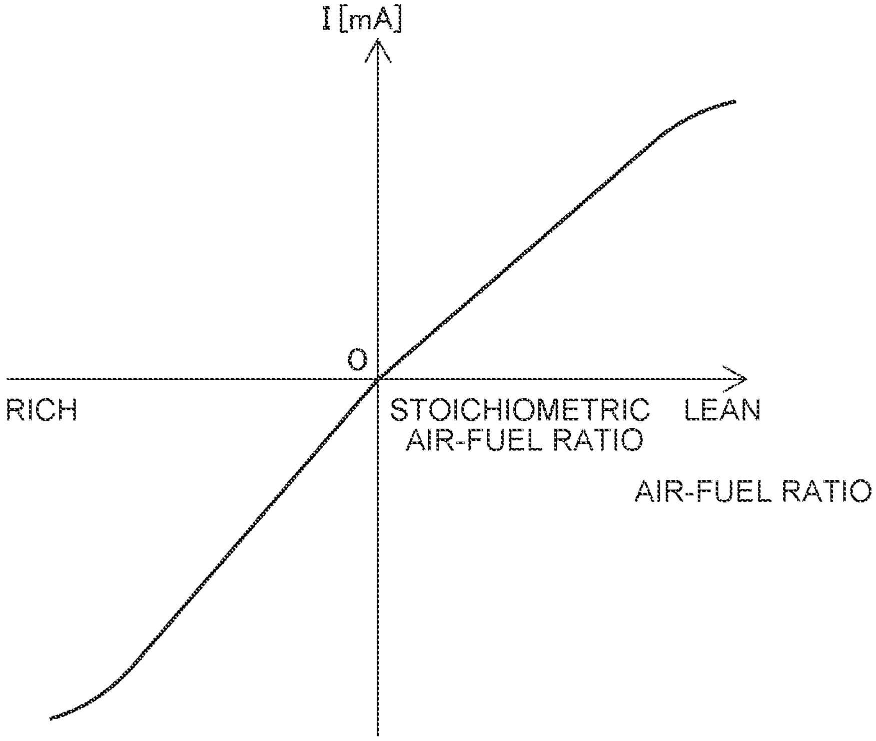
FIG. 5 illustrates a relationship between the air-fuel ratio of exhaust gas and an output current in the upstream air-fuel ratio sensor when an applied voltage is constant.

FIG. 5 illustrates a relationship between the air-fuel ratio of the exhaust gas and the output current I in the upstream air-fuel ratio sensor 41 when the applied voltage is constant. In the example in FIG. 5, a voltage of 0.45 V is applied to the sensor element 411. As can be seen from FIG. 5, the output current I is zero when the air-fuel ratio of the exhaust gas is the stoichiometric air-fuel ratio. In the downstream air-fuel ratio sensor 42, the output current I increases as the concentration of oxygen in the exhaust gas increases, that is, as the air-fuel ratio of the exhaust gas is leaner. Thus, the downstream air-fuel ratio sensor 42 and the upstream air-fuel ratio sensor 41 having the same configuration as that of the downstream air-fuel ratio sensor 42 can continuously (linearly) detect the air-fuel ratio of the exhaust gas.

In the present embodiment, limit current type air-fuel ratio sensors are used as the upstream air-fuel ratio sensor 41 and the downstream air-fuel ratio sensor 42. Air-fuel ratio sensors other than the limit current type air-fuel ratio sensors may be used as the upstream air-fuel ratio sensor 41 and the downstream air-fuel ratio sensor 42 as long as the output changes linearly relative to the air-fuel ratio of the exhaust gas. The upstream air-fuel ratio sensor 41 and the downstream air-fuel ratio sensor 42 may be air-fuel ratio sensors having different structures.

The ECU 31 controls the air-fuel ratio of exhaust gas that flows into the catalyst 20 (hereinafter referred to as "in-flow exhaust gas"). As described above, the air-fuel ratio of the in-flow exhaust gas is detected by the upstream air-fuel ratio sensor 41. Therefore, the ECU 31 controls the air-fuel ratio of the in-flow exhaust gas based on the output from the upstream air-fuel ratio sensor 41. Specifically, feedback control is performed on the amount of fuel to be supplied to the combustion chamber 5 so that the output air-fuel ratio from the upstream air-fuel ratio sensor 41 agrees with a target air-fuel ratio. The "output air-fuel ratio" means an air-fuel ratio corresponding to an output value from an air-fuel ratio sensor, that is, an air-fuel ratio detected by the air-fuel ratio sensor.

As described above, the air-fuel ratio of exhaust gas that flows out of the catalyst 20 (hereinafter referred to as "out-flow exhaust gas") is detected by the downstream air-fuel ratio sensor 42. The air-fuel ratio of the out-flow exhaust gas indicates a control state of the exhaust gas in the catalyst 20. When the exhaust gas is not appropriately controlled in the catalyst 20, the output air-fuel ratio from the downstream air-fuel ratio sensor 42 deviates from the stoichiometric air-fuel ratio. Therefore, the ECU 31 corrects the air-fuel ratio control based on the output from the downstream air-fuel ratio sensor 42. For example, the ECU 31 corrects the target air-fuel ratio of the in-flow exhaust gas based on the output from the downstream air-fuel ratio sensor 42. Therefore, the air-fuel ratio of the in-flow exhaust gas can be controlled at an appropriate value, and the catalyst 20 can effectively control the exhaust gas.

When the combustion state of an air-fuel mixture is unstable as in a case of cold start of the internal combustion engine, however, exhaust gas containing a large amount of unburned polymer HC is discharged into the exhaust passage, and its air-fuel ratio is detected by the upstream air-fuel ratio sensor 41. When the exhaust gas contains a large amount of polymer HC, the diffusion coefficient D in the above Expression (1) of the limit current value IL is smaller than a predetermined value based on, for example, the porosity of the diffusion limitation layer 413. As a result, the output current from the sensor element 411 is larger than a value corresponding to the actual air-fuel ratio of the exhaust gas, and the output air-fuel ratio from the upstream air-fuel ratio sensor 41 deviates from the actual value to the lean side. Therefore, when the feedback control on the air-fuel ratio is performed based on the output from the upstream air-fuel ratio sensor 41, the actual air-fuel ratio may deviate from the target value to the rich side, which may exacerbate exhaust emissions.

Figure 6:
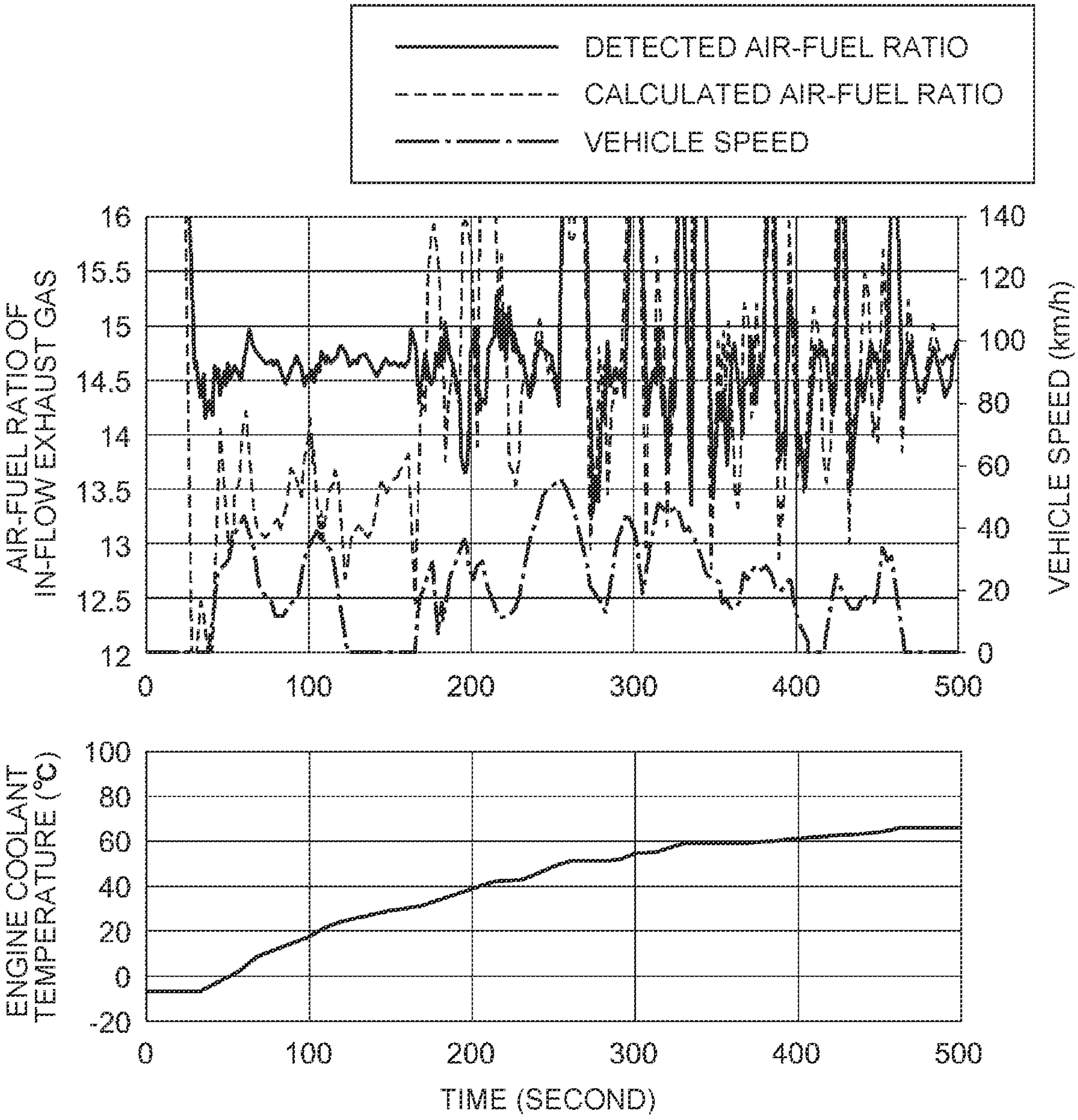
FIG. 6 is a time chart of various parameters when the internal combustion engine is being warmed up.

FIG. 6 is a time chart of various parameters when the internal combustion engine is being warmed up. FIG. 6 shows, as various parameters, the temperature of the coolant of the internal combustion engine (engine coolant temperature), the speed of the vehicle on which the internal combustion engine is mounted (vehicle speed), the air-fuel ratio of the in-flow exhaust gas that is detected by the upstream air-fuel ratio sensor 41 (detected air-fuel ratio), and the air-fuel ratio of the in-flow exhaust gas that is calculated by computation (calculated air-fuel ratio). In the upper graph of FIG. 6, the detected air-fuel ratio is represented by a continuous line, the calculated air-fuel ratio is represented by a dashed line, and the vehicle speed is represented by a long dashed short dashed line.

In the example of FIG. 6, when 100 seconds have elapsed, the engine coolant temperature is low and the warm-up of the internal combustion engine is not completed. At this time, the detected air-fuel ratio is maintained in the vicinity of the stoichiometric air-fuel ratio, but the calculated air-fuel ratio approximate to the actual air-fuel ratio is richer than the stoichiometric air-fuel ratio. That is, the result in FIG. 6 shows that, when the air-fuel ratio control to maintain the output air-fuel ratio from the upstream air-fuel ratio sensor 41 at the stoichiometric air-fuel ratio is performed during the cold start of the internal combustion engine, the actual air-fuel ratio of the exhaust gas is richer than the stoichiometric air-fuel ratio due to the influence of polymer HC in the exhaust gas.

Even if the exhaust gas containing a large amount of unburned polymer HC is discharged into the exhaust passage, the polymer HC in the exhaust gas is removed or decomposed into HC having a smaller molecular weight in the catalyst 20. Therefore, the output deviation of the upstream air-fuel ratio sensor 41 is less likely to occur in the downstream air-fuel ratio sensor 42 disposed on the downstream side of the catalyst 20.

In the present embodiment, the ECU 31 controls the air-fuel ratio of the in-flow exhaust gas based on the output from the downstream air-fuel ratio sensor 42 without using the output from the upstream air-fuel ratio sensor 41 when a predetermined condition is satisfied, and controls the air-fuel ratio of the in-flow exhaust gas based on the output from the upstream air-fuel ratio sensor 41 when the predetermined condition is not satisfied. Thus, the influence of the output deviation of the upstream air-fuel ratio sensor 41 can be reduced. Furthermore, the exacerbation of the exhaust emissions due to the output deviation of the upstream air-fuel ratio sensor 41 can be suppressed.

The predetermined condition is a condition under which the concentration of polymer HC in the exhaust gas discharged into the exhaust passage is high. For example, the predetermined condition is that the warm-up of the internal combustion engine is not completed. In this case, the ECU 31 controls the air-fuel ratio of the in-flow exhaust gas based on the output from the downstream air-fuel ratio sensor 42 without using the output from the upstream air-fuel ratio sensor 41 during the period from the start of the internal combustion engine to the completion of the warm-up of the internal combustion engine. Even before the warm-up of the internal combustion engine is completed, the downstream air-fuel ratio sensor 42 can be activated early by heating the sensor element with the heaters.

In the present embodiment, when the predetermined condition is satisfied, the ECU 31 controls the air-fuel ratio of the in-flow exhaust gas without using the output from the upstream air-fuel ratio sensor 41 to cause the output air-fuel ratio from the downstream air-fuel ratio sensor 42 to agree with the stoichiometric air-fuel ratio. Thus, the air-fuel ratio of the out-flow exhaust gas can be brought closer to the stoichiometric air-fuel ratio, and the exacerbation of the exhaust emissions can be suppressed. In this case, for example, the ECU 31 sets the target air-fuel ratio of the in-flow exhaust gas to a value leaner than the stoichiometric air-fuel ratio when the output air-fuel ratio from the downstream air-fuel ratio sensor 42 is equal to or lower than a predetermined rich-determination air-fuel ratio that is richer than the stoichiometric air-fuel ratio, and sets the target air-fuel ratio of the in-flow exhaust gas to a value richer than the stoichiometric air-fuel ratio when the output air-fuel ratio from the downstream air-fuel ratio sensor 42 is equal to or higher than a predetermined lean-determination air-fuel ratio that is leaner than the stoichiometric air-fuel ratio.

Figure 7:
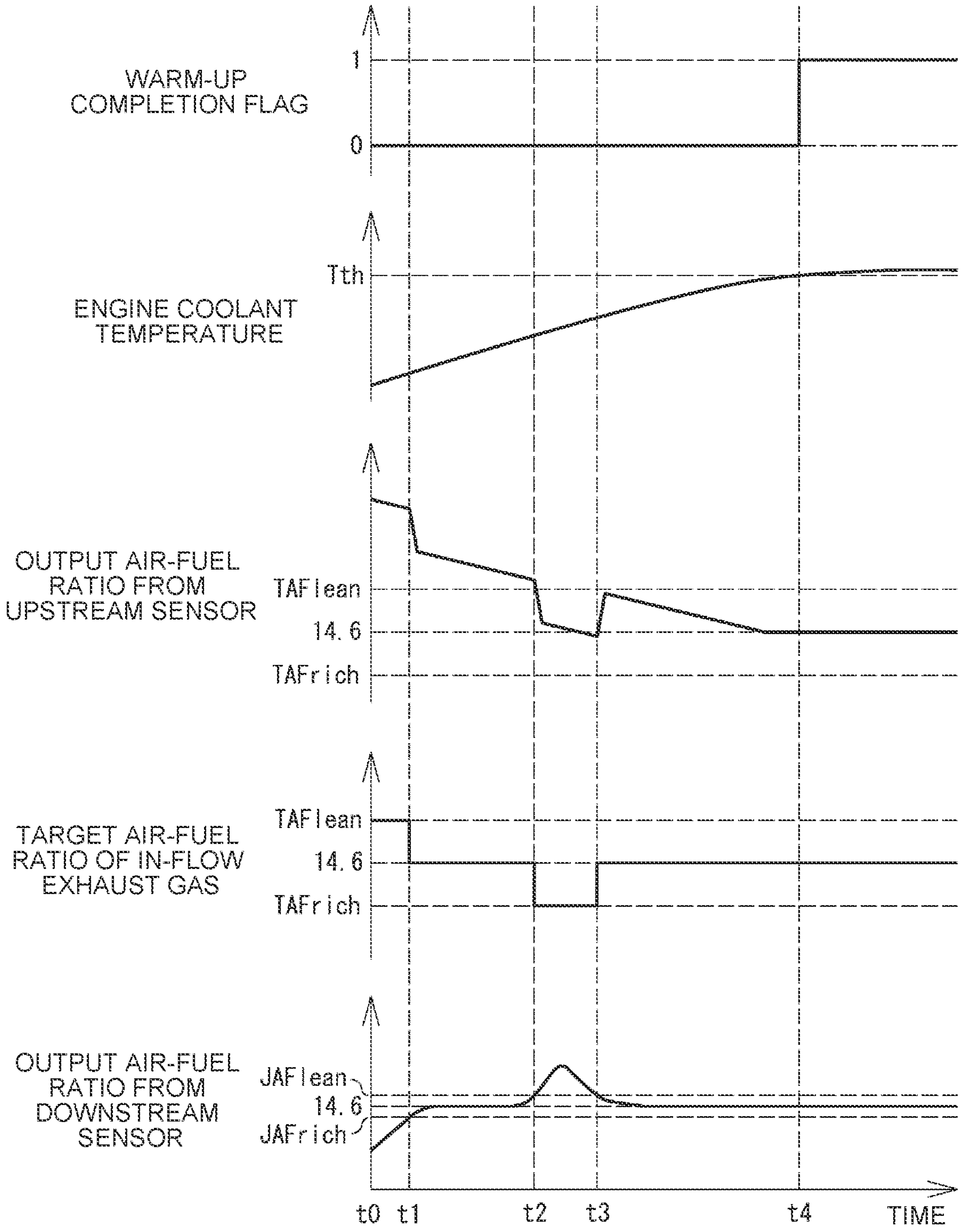
FIG. 7 is a time chart of various parameters when air-fuel ratio control according to the embodiment of the present disclosure is performed during cold start of the internal combustion engine.

Next, the air-fuel ratio control will be described with reference to a time chart. The air-fuel ratio control described above will be described in detail below with reference to FIG. 7. FIG. 7 is a time chart of various parameters when the air-fuel ratio control according to the embodiment of the present disclosure is performed during the cold start of the internal combustion engine. FIG. 7 shows, as various parameters, the output air-fuel ratio from the downstream air-fuel ratio sensor 42 (output air-fuel ratio from downstream sensor), the target air-fuel ratio of the in-flow exhaust gas, the output air-fuel ratio from the upstream air-fuel ratio sensor 41 (output air-fuel ratio from upstream sensor), the temperature of the coolant of the internal combustion engine (engine coolant temperature), and a warm-up completion flag. The warm-up completion flag is set to 0 when the internal combustion engine is started, and is set to 1 when the warm-up of the internal combustion engine is completed.

In the example of FIG. 7, at a time t0, the warm-up of the internal combustion engine is not completed, and the output air-fuel ratio from the downstream air-fuel ratio sensor 42 is equal to or lower than a rich-determination air-fuel ratio JAFrich. Therefore, the target air-fuel ratio of the in-flow exhaust gas is set to a lean-setting air-fuel ratio TAFlean that is leaner than the stoichiometric air-fuel ratio. At this time, the output from the upstream air-fuel ratio sensor 41 deviates due to the influence of polymer HC, and the output air-fuel ratio from the upstream air-fuel ratio sensor 41 is leaner than the lean-setting air-fuel ratio TAFlean. Since the concentration of polymer HC in the exhaust gas gradually decreases as the engine coolant temperature rises, the output air-fuel ratio from the upstream air-fuel ratio sensor 41 gradually approaches the target air-fuel ratio of the in-flow exhaust gas after the time t0.

After the time t0, the output air-fuel ratio from the downstream air-fuel ratio sensor 42 changes toward the stoichiometric air-fuel ratio, and reaches the rich-determination air-fuel ratio JAFrich at a time t1. As a result, the target air-fuel ratio of the in-flow exhaust gas is changed from the lean-setting air-fuel ratio TAFlean to the stoichiometric air-fuel ratio (14.6).

At a time t2, the output air-fuel ratio from the downstream air-fuel ratio sensor 42 reaches a lean-determination air-fuel ratio JAFlean due to influence of disturbance or the like. As a result, the target air-fuel ratio of the in-flow exhaust gas is changed from the stoichiometric air-fuel ratio to a rich-setting air-fuel ratio TAFrich to bring the air-fuel ratio of the out-flow exhaust gas closer to the stoichiometric air-fuel ratio.

At a time t3 after the time t2, the output air-fuel ratio from the downstream air-fuel ratio sensor 42 decreases to the lean-determination air-fuel ratio JAFlean, and the target air-fuel ratio of the in-flow exhaust gas is changed from the rich-setting air-fuel ratio TAFrich to the stoichiometric air-fuel ratio.

After the time t3, the warm-up of the internal combustion engine is continued. At a time t4, the engine coolant temperature reaches a predetermined temperature Tth. As a result, determination is made that the warm-up of the internal combustion engine is completed, and the warm-up completion flag is set to 1. At the time t4, the output deviation of the upstream air-fuel ratio sensor 41 is eliminated, and the output air-fuel ratio from the upstream air-fuel ratio sensor 41 is equal to the target air-fuel ratio of the in-flow exhaust gas (stoichiometric air-fuel ratio). After the time t4, feedback control on the air-fuel ratio is performed so that the output air-fuel ratio from the upstream air-fuel ratio sensor 41 agrees with the target air-fuel ratio of the in-flow exhaust gas.

Figure 8:
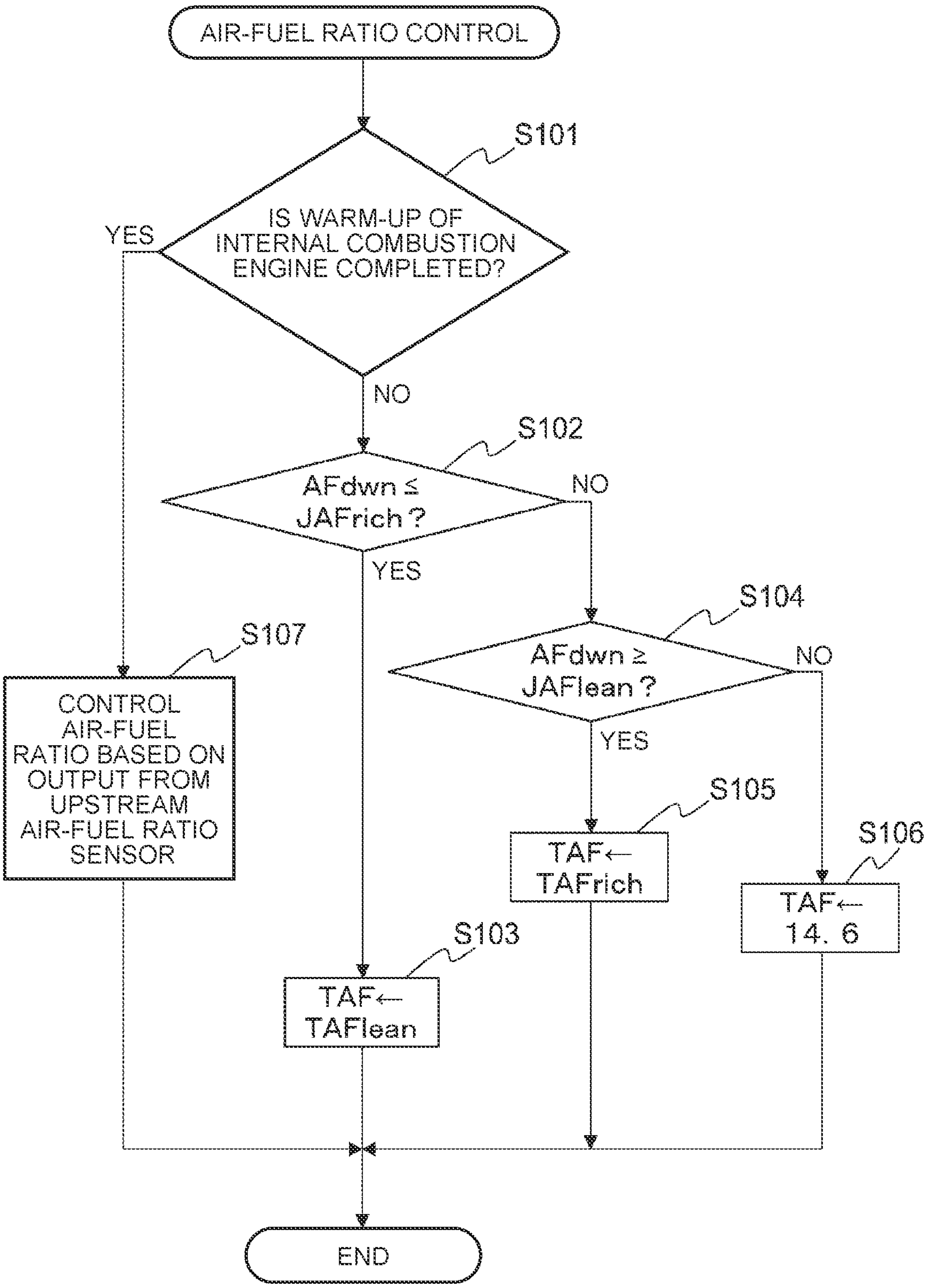
FIG. 8 is a flowchart illustrating a control routine of the air-fuel ratio control according to the present embodiment.

Next, a flowchart of the air-fuel ratio control will be described. A processing flow of the air-fuel ratio control described above will be described below with reference to a flowchart of FIG. 8. FIG. 8 is a flowchart illustrating a control routine of the air-fuel ratio control according to the present embodiment. The present control routine is executed repeatedly at predetermined execution intervals by the ECU 31 that functions as the air-fuel ratio control device.

In Step S101, the ECU 31 first determines whether the warm-up of the internal combustion engine is completed. For example, the ECU 31 determines that the warm-up of the internal combustion engine is completed when the engine coolant temperature rises to a predetermined temperature. The engine coolant temperature is detected by the coolant temperature sensor 43. The predetermined temperature is set to, for example, 40° C. to 60° C.

The ECU 31 may determine that the warm-up of the internal combustion engine is completed when an integrated value of flow rates of the exhaust gas discharged into the exhaust passage after the start of the internal combustion engine reaches a predetermined value. In this case, the flow rate of the exhaust gas is calculated based on the output from the air flow meter 40 or detected by a flow rate sensor provided in the exhaust passage on an upstream side of the catalyst 20. The ECU 31 may determine that the warm-up of the internal combustion engine is completed when the temperature of the catalyst 20 (bed temperature) rises to a predetermined temperature. In this case, the temperature of the catalyst 20 is calculated based on predetermined state quantities of the internal combustion engine (for example, engine coolant temperature, intake air amount, and engine load) or detected by a temperature sensor provided in the catalyst 20 or in the exhaust passage in the vicinity of the catalyst 20. The ECU 31 may determine that the warm-up of the internal combustion engine is completed when an elapsed period from the start of the internal combustion engine reaches a predetermined period.

When the warm-up of the internal combustion engine is completed and the concentration of polymer HC in the in-flow exhaust gas decreases, the output deviation of the upstream air-fuel ratio sensor 41 is eliminated and the output from the upstream air-fuel ratio sensor 41 is stabilized. Therefore, the ECU 31 may determine that the warm-up of the internal combustion engine is completed when the amount of change in the output from the upstream air-fuel ratio sensor 41 during a predetermined period is equal to or smaller than a predetermined value. The amount of change in the output is calculated, for example, as a difference between the maximum value and the minimum value of the output during the predetermined period or a variance (square of deviation) of the output detected during the predetermined period.

When determination is made in Step S101 that the warm-up of the internal combustion engine is not completed, the control routine proceeds to Step S102. In Step S102, the ECU 31 determines whether an output air-fuel ratio AFdwn from the downstream air-fuel ratio sensor 42 is equal to or lower than the rich-determination air-fuel ratio JAFrich. The rich-determination air-fuel ratio JAFrich is predetermined as a value indicating that the air-fuel ratio of the out-flow exhaust gas is richer than the stoichiometric air-fuel ratio, and is set to a value slightly richer than the stoichiometric air-fuel ratio (for example, 14.55 to 14.58).

When determination is made in Step S102 that the output air-fuel ratio AFdwn from the downstream air-fuel ratio sensor 42 is equal to or lower than the rich-determination air-fuel ratio JAFrich, the control routine proceeds to Step S103. In Step S103, the ECU 31 sets a target air-fuel ratio TAF of the in-flow exhaust gas to the lean-setting air-fuel ratio TAFlean to bring the output air-fuel ratio AFdwn from the downstream air-fuel ratio sensor 42 closer to the stoichiometric air-fuel ratio. The lean-setting air-fuel ratio TAFlean is set to a predetermined air-fuel ratio (for example, 14.7 to 15.7) that is leaner than the stoichiometric air-fuel ratio. After Step S103, the control routine is terminated.

When determination is made in Step S102 that the output air-fuel ratio AFdwn from the downstream air-fuel ratio sensor 42 is leaner than the rich-determination air-fuel ratio JAFrich, the control routine proceeds to Step S104. In Step S104, the ECU 31 determines whether the output air-fuel ratio AFdwn from the downstream air-fuel ratio sensor 42 is equal to or higher than the lean-determination air-fuel ratio JAFlean. The lean-determination air-fuel ratio JAFlean is predetermined as a value indicating that the air-fuel ratio of the out-flow exhaust gas is leaner than the stoichiometric air-fuel ratio, and is set to a value slightly leaner than the stoichiometric air-fuel ratio (for example, 14.62 to 14.65).

When determination is made in Step S104 that the output air-fuel ratio AFdwn from the downstream air-fuel ratio sensor 42 is equal to or higher than the lean-determination air-fuel ratio JAFlean, the control routine proceeds to Step S105. In Step S105, the ECU 31 sets the target air-fuel ratio TAF of the in-flow exhaust gas to the rich-setting air-fuel ratio TAFrich to bring the output air-fuel ratio AFdwn from the downstream air-fuel ratio sensor 42 closer to the stoichiometric air-fuel ratio. The rich-setting air-fuel ratio TAFrich is set to a predetermined air-fuel ratio (for example, 13.5 to 14.5) that is richer than the stoichiometric air-fuel ratio. After Step S105, the control routine is terminated.

When determination is made in Step S104 that the output air-fuel ratio AFdwn from the downstream air-fuel ratio sensor 42 is richer than the lean-determination air-fuel ratio JAFlean, the control routine proceeds to Step S106. In Step S106, the ECU 31 sets the target air-fuel ratio TAF of the in-flow exhaust gas to the stoichiometric air-fuel ratio (14.6) to maintain the output air-fuel ratio AFdwn from the downstream air-fuel ratio sensor 42 at the stoichiometric air-fuel ratio. After Step S106, the control routine is terminated.

When determination is made in Step S101 that the warm-up of the internal combustion engine is completed, the control routine proceeds to Step S107. In Step S107, the ECU 31 performs feedback control on the air-fuel ratio of the in-flow exhaust gas based on the output from the upstream air-fuel ratio sensor 41. Specifically, the feedback control is performed on the amount of fuel to be supplied to the combustion chamber 5 so that the output air-fuel ratio from the upstream air-fuel ratio sensor 41 agrees with the target air-fuel ratio of the in-flow exhaust gas. The target air-fuel ratio of the in-flow exhaust gas is set, for example, to the stoichiometric air-fuel ratio. The target air-fuel ratio of the in-flow exhaust gas may be corrected based on the output from the downstream air-fuel ratio sensor 42. The ECU 31 may switch the target air-fuel ratio of the in-flow exhaust gas between the rich-setting air-fuel ratio TAFrich and the lean-setting air-fuel ratio TAFlean based on the output from the downstream air-fuel ratio sensor 42 so that the oxygen storage amount of the catalyst 20 varies between zero and the maximum oxygen storage amount. After Step S107, the control routine is terminated.

The combustion state of the air-fuel mixture is likely to be unstable also when the intake air amount is small as in a case where the load is low. Therefore, the predetermined condition may be that the intake air amount is equal to or smaller than a predetermined value. In this case, the ECU 31 determines in Step S101 whether the intake air amount is larger than the predetermined value. The intake air amount is calculated based on, for example, the output from the air flow meter 40. That is, the ECU 31 may control the air-fuel ratio of the in-flow exhaust gas based on the output from the downstream air-fuel ratio sensor 42 without using the output from the upstream air-fuel ratio sensor 41 when the intake air amount is equal to or smaller than the predetermined value.

The combustion state of the air-fuel mixture is likely to be unstable also when an idling of the internal combustion engine is executed. Therefore, the predetermined condition may be that the idling of the internal combustion engine is executed. The idling means an operation state in which the engine speed is maintained at a predetermined low speed (for example, 400 to 800 rpm) by combustion of the air-fuel mixture when the accelerator operation amount is zero. In this case, the ECU 31 determines in Step S101 whether the idling of the internal combustion engine is executed. When the idling of the internal combustion engine is executed, the control routine proceeds to Step S102. That is, the ECU 31 may control the air-fuel ratio of the in-flow exhaust gas based on the output from the downstream air-fuel ratio sensor 42 without using the output from the upstream air-fuel ratio sensor 41 when the idling of the internal combustion engine is executed.

Other embodiments will be described. Although the preferred embodiments of the present disclosure have been described above, the present disclosure is not limited to these embodiments, and various revisions and modifications may be made within the scope of the claims. For example, when the predetermined condition is satisfied, the ECU 31 may perform feedback control such as proportional-integral-derivative (PID) control on the air-fuel ratio of the in-flow exhaust gas based on the output from the downstream air-fuel ratio sensor 42 to cause the output air-fuel ratio from the downstream air-fuel ratio sensor 42 to agree with the stoichiometric air-fuel ratio.

In the internal combustion engine, a downstream catalyst similar to the catalyst 20 may be disposed in the exhaust passage on a downstream side of the catalyst 20. In this case, when the predetermined condition is satisfied, the ECU 31 may control, in order to control the state of the downstream catalyst (oxygen storage amount or the like), the air-fuel ratio of the in-flow exhaust gas without using the output from the upstream air-fuel ratio sensor 41 to cause the output air-fuel ratio from the downstream air-fuel ratio sensor 42 to agree with a predetermined air-fuel ratio other than the stoichiometric air-fuel ratio.

What is claimed is:

1. An exhaust gas control apparatus for an internal combustion engine, the exhaust gas control apparatus comprising:

- a catalyst disposed in an exhaust passage;
- an upstream air-fuel ratio sensor configured to detect an air-fuel ratio of in-flow exhaust gas that flows into the catalyst;
- a downstream air-fuel ratio sensor configured to detect an air-fuel ratio of out-flow exhaust gas that flows out of the catalyst; and
- an electronic control unit configured to control the air-fuel ratio of the in-flow exhaust gas, wherein
- the electronic control unit is configured to, when a predetermined condition is satisfied, perform feedback control on the air-fuel ratio of the in-flow exhaust gas based on an output from the downstream air-fuel ratio sensor without using an output from the upstream air-fuel ratio sensor, and
- the electronic control unit is configured to, when the predetermined condition is not satisfied, control the air-fuel ratio of the in-flow exhaust gas based on the output from the upstream air-fuel ratio sensor.

2. The exhaust gas control apparatus according to claim 1, wherein the electronic control unit is configured to, when the predetermined condition is satisfied, control the air-fuel ratio of the in-flow exhaust gas without using the output from the upstream air-fuel ratio sensor to cause the air-fuel ratio detected by the downstream air-fuel ratio sensor to agree with a stoichiometric air-fuel ratio.

3. The exhaust gas control apparatus according to claim 1, wherein the predetermined condition is that warm-up of the internal combustion engine is not completed.

4. The exhaust gas control apparatus according to claim 3, wherein the electronic control unit is configured to determine that the warm-up of the internal combustion engine is completed when a temperature of a coolant of the internal combustion engine rises to a predetermined temperature.

5. The exhaust gas control apparatus according to claim 1, wherein the predetermined condition is that an intake air amount is equal to or smaller than a predetermined value.

6. The exhaust gas control apparatus according to claim 1, wherein the predetermined condition is that an idling of the internal combustion engine is executed.

7. An exhaust gas control method for an exhaust gas control apparatus for an internal combustion engine, the exhaust gas control apparatus including a catalyst disposed in an exhaust passage, an upstream air-fuel ratio sensor configured to detect an air-fuel ratio of in-flow exhaust gas that flows into the catalyst, a downstream air-fuel ratio sensor configured to detect an air-fuel ratio of out-flow exhaust gas that flows out of the catalyst, and an electronic control unit configured to control the air-fuel ratio of the in-flow exhaust gas, the exhaust gas control method comprising:

- performing when a predetermined condition is satisfied, feedback control on the air-fuel ratio of the in-flow exhaust gas based on an output from the downstream air-fuel ratio sensor without using an output from the upstream air-fuel ratio sensor; and
- controlling, when the predetermined condition is not satisfied, the air-fuel ratio of the in-flow exhaust gas based on the output from the upstream air-fuel ratio sensor.

8. The exhaust gas control apparatus according to claim 1, wherein the electronic control unit is configured to:

- set a target air-fuel ratio of the in-flow exhaust gas to a lean-setting air-fuel ratio when the air-fuel ratio detected by the downstream air-fuel ratio sensor is equal to or lower than a rich-determination air-fuel ratio, the rich-determination air-fuel ratio being set to 14.55 to 14.58, the lean-setting air-fuel ratio being set to 14.7 to 15.7;
- determine whether the air-fuel ratio detected by the downstream air-fuel ratio sensor is equal to or higher than a lean-determination air-fuel ratio when the air-fuel ratio detected by the downstream air-fuel ratio sensor is leaner than the rich-determination air-fuel ratio, the lean-determination air-fuel ratio being set to 14.62 to 14.65; and
- set the target air-fuel ratio of the in-flow exhaust gas to a rich-setting air-fuel ratio when the air-fuel ratio detected by the downstream air-fuel ratio sensor is determined to be equal to or higher than the lean-determination air-fuel ratio, the rich-setting air-fuel ratio being 13.5 to 14.5.

* * * * *